Nov. 6, 1962   J. G. GILL ETAL   3,062,493
STAND FOR FLORAL DISPLAYS
Original Filed Sept. 19, 1960
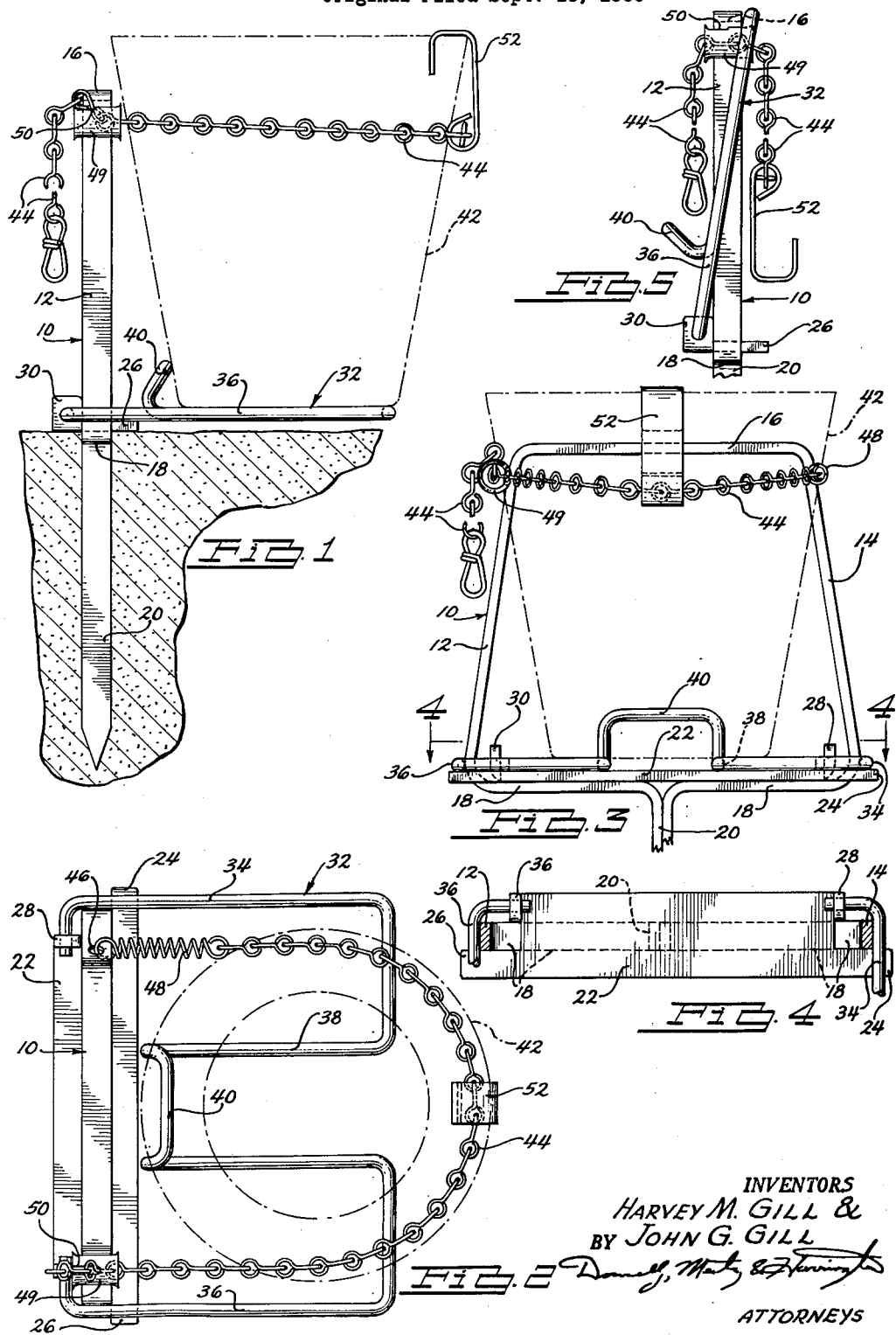
INVENTORS
HARVEY M. GILL &
BY JOHN G. GILL
ATTORNEYS 3,062,493
Patented Nov. 6, 1962

3,062,493
STAND FOR FLORAL DISPLAYS
John G. Gill, 19121 Woodmont, Harper Woods 36, Mich., and Harvey M. Gill, Box 155A, Rte. 1, Freeport, Mich.
Continuation of application Ser. No. 56,875, Sept. 19, 1960. This application Aug. 21, 1961, Ser. No. 134,534
5 Claims. (Cl. 248—150)

Our invention relates generally to collapsible holders for decorative articles, and more particularly to a stand capable of holding potted plants.

This application is a continuation of Serial No. 56,875, filed Sept. 19, 1960, now abandoned.

We contemplate that our improved stand can be used to advantage by morticians for making floral displays at cemeteries. The stand can be readily stored and transported in quantity when not in use, and it is formed with collapsible members for this purpose. To condition the stand for use in a floral display, the stand can be unfolded and a stem portion thereof can be inserted into the ground to provide support. A foot engaging member is provided on the stand to facilitate driving the stem portion into the ground.

Our stand is particularly adapted to be used with potted plants with a variety of forms and sizes. For this reason, it is particularly useful in creating outdoor floral displays for occasional lawn parties and for other special events.

The provision of a stand of the type above set forth being a principal object of our invention, it is a further object of our invention to provide a flower stand that is collapsible to a flat position to facilitate storage.

It is a further object of our invention to provide a stand of the type above set forth which is of simplified construction and which is comprised of relatively rigid structural members. These members can be made of steel or of other suitable metal such as aluminum. Further, we contemplate that various non-metallic structural materials can be employed for this purpose.

It is a further object of our invention to provide a collapsible stand of the type above set forth and which includes a platform portion pivotally mounted on a rigid frame portion, the platform portion being adapted to be pivoted to a position directly adjacent the frame portion when not in use.

It is a further object of our invention to provide a collapsible stand of the type set forth in the preceding object wherein the platform portion has spring characteristics that provide a snap action when the platform portion is pivoted to its inoperative position. The platform portion therefore will be retained in place in its folded position when it is in storage.

Further objects of our invention will become apparent from the following particular description and from the accompanying drawings wherein, FIG. 1 is a side elevational view of our improved stand;

FIG. 2 is a plan view of our stand showing the platform portion in its operative position;

FIG. 3 is a front elevational view of FIGS. 1 and 2;

FIG. 4 is a partial cross sectional view taken along such line 4—4 of FIG. 3; and, FIG. 5 is a partial side elevational view showing the platform portion in a collapsed position.

Referring first to FIGS. 1, 2 and 3, numeral 10 generally designates the frame portion of our stand. When viewed in FIG. 3, the frame portion is generally trapezoidal in shape, and the side portions 12 and 14 deviate from a vertical reference line as indicated. A top portion 16 of the frame 10 is relatively shorter in lineal extent than the base portion 18.

The sides 12 and 14 and the top and base portions 16 and 18, respectively, are formed of a single piece of bar stock. The ends of the bar stock are disposed in juxtaposed, abutting relationship, as shown at 20, to define a stem that extends downwardly, as viewed in FIGS. 1 and 3, in a direction that is normal to base portion 18. The terminal portion of the stem 20 is formed with a point, as shown in FIG. 1, to facilitate insertion of the stem into the ground. The ends of the bar stock which define the stem 20 can be spot welded or otherwise secured together in a permanent fashion.

A base plate 22 in the form of a flat plate is secured by welding or by any other suitable fastening method to base portion 18 of the frame 10. The width of the base plate 22 is substantially greater than the corresponding width of the frame 10. Corresponding corners of a plate 22 extend transversely outwardly of the frame 10, as shown at 24 and 26. The other two corners of the base plate 22 are turned upwardly in a normal direction as shown at 28 and 30. These corners 28 and 30 are formed with eyelets as indicated.

A platform portion is generally shown at 32 and, by preference, it comprises a steel rod with spring qualities. The ends of the rod are received within the eyelets for the corners 30 and 28. These ends are bent in a direction perpendicular to the sides 34 and 36 of the platform portion 32. The sides 34 and 36 engage the outer sides 12 and 14 of the frame 10.

The platform portion 32 is generally rectangular in form, and the forward side thereof is bent so that it extends inwardly as shown at 38. The extreme inward end portion 38 is turned in an upward direction, as shown at 40, thereby forming an abutment.

The sides 34 and 36 of the platform portion 32 engage the shoulders formed by the corners 24 and 26 when it assumes the position shown in FIGS. 1, 2 and 3. When it is in this position, the sides 12 and 14 of the frame 10 cause the sides 34 and 36 of the platform portion 32 to expand, the platform portion 32 being sufficiently resilient to accommodate this expansion. When this occurs, the ends of the rod of which platform portion 32 is formed, move outwardly in the eyelets for the corners 28 and 30.

When the platform portion is moved upwardly to the position shown in FIG. 3, the sides 34 and 36 slide along the sides 12 and 14 of the frame 10. Since the transverse dimension of the frame 10 at the upper portion thereof is less than the corresponding dimension of the base portion, the sides 34 and 36 move inwardly under the influence of the spring stresses in the frame portion 32. This provides a snap action when the platform portion 32 is folded, and the platform portion 32 therefore is retained in the position illustrated in FIG. 5 without any undesirable relative movement between the platform portion 32 and the frame 10. When the platform portion 32 is in the position shown in FIG. 5, the stand can be readily stored by stacking, and it requires a minimum amount of storage space.

As best seen in FIGS. 1, 2 and 3, the stand is capable of supporting a potted plant shown by means of phantom lines at 42. The plant 42 is positioned on the platform portion 32 and the abutment 40 prevents undesirable sliding of the plant 42 when it is so positioned. Movement of the plant 42 in an outward direction can be prevented by means of a chain 44 which may be caused to encircle the plant 42. One end of the chain 44 is connected to an eyelet 46 in the frame 10 by means of a spring 48, the latter providing a degree of resiliency so that the potted plant 42 is retained against the abutment 40. The other end of the chain can be received through an eyelet 49 secured to the side 12 of the frame 10. The eyelet 49 can be formed with a slot 50 and the links of the chain can be received in the slot 50 when it is desired to anchor the chain 44 in position. The eyelet 49 and the slot 50 provide a convenient means for adjusting the length of the chain 44. Preferably, the chain 44 can be adjusted so that the spring 48 will gently tension the chain 44.

To help retain the chain 44 in position, a clip 52 can be fastened to the chain 44, and the end thereof can be received over the lip of the potted plant 42 as indicated in FIG. 1.

The base portion 22 can be used for driving the stem 20 into the ground. The width of the base 18 of the frame 10 is sufficiently great to permit a person's foot to engage the base portion 22 so that foot pressure can be applied to the frame 10.

Having thus described a preferred embodiment of our invention, what we claim and desire to secure by United States Letters Patent is:

1. A collapsible stand for supporting a floral display comprising: a frame of generally trapezoidal shape, a stem extending from the base of the frame, a base plate secured to the base of the frame comprising a shoulder portion extending transversely outward therefrom, and a platform portion pivotally mounted on said base plate and including sides extending to the outside of the sides of said frame, said platform portion being formed of a resilient rod which is engageable with said shoulder portion when it assumes a position in a plane perpendicular to the plane of said frame.

2. A stand for supporting a floral display, comprising: a frame having a generally trapezoidal shape, a stem extending from the base of said frame, a foot engaging base plate secured to said base, and a platform in the form of a resilient rod pivotally mounted on said base plate and having sides engageable with a transversely outward side of said frame, an intermediate section of said rod extending toward the pivotal axis of said platform and having a portion extending transversely of the plane of said platform to provide an abutment for said display.

3. A collapsible stand for supporting a floral display comprising: a frame of generally trapezoidal shape, a stem extending from the base of the frame, a base plate secured to the base of the frame comprising a shoulder portion extending transversely outward therefrom, a platform portion pivotally mounted on said base plate and including sides extending to the outside of the sides of said frame, said platform portion being formed of a resilient rod which is engageable with said shoulder portion when it assumes a position in a plane perpendicular to the plane of said frame, an eyelet secured to said frame at an upward portion thereof, and a chain connected to one side of said frame and extending through said eyelet, said chain being adapted to surround said display for retaining the latter, said eyelet being slotted to accommodate the links of said chain.

4. A stand for supporting a floral display, comprising: a frame having a generally trapezoidal shape, a stem extending from the base of said frame, a foot engaging base plate secured to said base, a platform in the form of a resilient rod pivotally mounted on said base plate and having sides engageable with a transversely outward side of said frame, an intermediate section of said rod extending toward the pivotal axis of said platform and having a portion extending transversely of the plane of said platform to provide an abutment for said display, an eyelet secured to said frame at an upward portion thereof, and a chain connected to one side of said frame and extending through said eyelet, said chain being adapted to surround said display for retaining the latter, said eyelet being slotted to accommodate the links of said chain.

5. A stand for supporting a floral display comprising: a frame having a shape in the form of a polygon, a stem extending from the base of said frame, said stem being adapted to be inserted in the ground to provide support for said stand, a platform pivotally mounted on said frame, said platform being adapted to oscillate on one side of said frame between two limiting angular positions, the plane of said platform substantially coinciding with the plane of said frame when said platform assumes one angular position, the plane of said platform being substantially perpendicular to the plane of said frame when the frame assumes a second angular position, means for inhibiting movement of said frame beyond said second position and spring means for maintaining said platform in said one position when it has been moved to said one position.

References Cited in the file of this patent

UNITED STATES PATENTS

| | | |
|---|---|---|
| 1,397,675 | Buske | Nov. 22, 1921 |
| 2,399,498 | Messick | Apr. 30, 1946 |
| 2,865,590 | Greenwell | Dec. 23, 1958 |